(12) United States Patent
Kaiser et al.

(10) Patent No.: US 6,485,660 B1
(45) Date of Patent: Nov. 26, 2002

(54) REINFORCED COMPOSITE PRODUCT AND APPARATUS AND METHOD FOR PRODUCING SAME

(75) Inventors: Mark A. Kaiser, Wadsworth, OH (US); Issam Faza, Lima, OH (US); Brice Marshall Nelson, deceased, late of Lima, OH (US), Joyce Nelson, executor

(73) Assignee: Marshall Industries Composites, Inc., Lima, OH (US)

( * ) Notice: Subject to any disclaimer, the term of this patent is extended or adjusted under 35 U.S.C. 154(b) by 258 days.

(21) Appl. No.: 09/696,559

(22) Filed: Oct. 25, 2000

Related U.S. Application Data

(60) Continuation of application No. 09/344,873, filed on Jun. 28, 1999, now Pat. No. 6,221,295, which is a division of application No. 08/938,904, filed on Sep. 26, 1997, now Pat. No. 6,316,074.
(60) Provisional application No. 60/027,675, filed on Oct. 7, 1996.

(51) Int. Cl.[7] ............................ B29C 70/06; B29C 53/02
(52) U.S. Cl. ........................ 264/145; 29/505; 29/521; 29/897.34; 156/180; 264/136; 264/166; 264/285; 264/339
(58) Field of Search ................................ 156/180, 433, 156/242, 245, 580, 253; 264/136, 137, 145, 166, 339, 285; 52/740.1, 740.3; 72/64, 226, 234; 29/897.34, 458, 460, 521, 505

(56) References Cited

U.S. PATENT DOCUMENTS

| | | | |
|---|---|---|---|
| 2,425,883 A | 8/1947 | Jackson | 72/59 |
| 2,949,054 A | 8/1960 | White | 411/908 X |

(List continued on next page.)

FOREIGN PATENT DOCUMENTS

| | | |
|---|---|---|
| DE | 3703974 A1 | 8/1988 |
| EP | 0 105 809 A2 | 4/1984 |

(List continued on next page.)

OTHER PUBLICATIONS

"C–Bar Composite Offered to Solve Corrosion Problems Fiber Reinforced Plastic(FRP) Rebar For Concrete Also Uses Green Materials"; Composite News: InFrastructure; (Feb 14, 1995).
Modern Plastics Encyclopedia 1983–1984, Oct. 1983, vol. 60, No. 10A, pp. 200, 202, 204, 205.
Loud, Inside Manufacturing: Rebar: Steel vs. Composites, Composites Technology, pp. 15–18 (May/Jun. 1995).
PCT International Search Report, PCT/US97/17292.

Primary Examiner—Mark Eashoo
(74) Attorney, Agent, or Firm—Myers Bigel Sibley & Sajovec P.A.

(57) ABSTRACT

A rebar forming apparatus includes a malleable material supply station for continuously supplying a malleable planar material and a malleable material forming station for forming the malleable material into first and second corresponding shell portions and related rebar products. The apparatus also includes a core pultrusion station and a cladding forming station for respectively forming core and cladding layers. A shell forming station is positioned downstream of the core and cladding forming stations which unites the first and second shell portions to form an outer shell with the core and cladding layers contained therein. The rebar product includes shell portions which are matably configured to form a disposable outer shell over the core and cladding layers. Related reinforcing composite product forming methods also include the use of a removable outer shell.

46 Claims, 3 Drawing Sheets

U.S. PATENT DOCUMENTS

| | | | |
|---|---|---|---|
| 3,167,882 A | 2/1965 | Abbott ................ 50/128 |
| 3,235,429 A | 2/1966 | Boggs ................ 156/166 |
| 3,495,494 A | 2/1970 | Scott ................ 411/908 X |
| 3,551,542 A | 12/1970 | Perrone |
| 3,646,610 A | 2/1972 | Jackson ................ 273/80 |
| 3,700,752 A | 10/1972 | Hutchinson ................ 260/859 R |
| 3,721,643 A | 3/1973 | Vargiu et al. ................ 260/40 R |
| 3,748,721 A | 7/1973 | Alexander ................ 29/471.3 |
| 3,769,127 A | 10/1973 | Goldsworthy et al. .. 156/425 X |
| 3,793,108 A | 2/1974 | Goldsworthy ................ 156/180 |
| 3,853,656 A | 12/1974 | McNeely et al. ....... 156/441 X |
| 3,859,409 A | 1/1975 | Coonrod ................ 264/295 |
| 3,886,229 A | 5/1975 | Hutchinson et al. .... 260/859 R |
| 3,929,929 A | 12/1975 | Kuehn ................ 260/859 R |
| 3,959,209 A | 5/1976 | Lake ................ 260/40 R |
| 4,016,714 A | 4/1977 | Crandall et al. ................ 57/149 |
| 4,062,826 A | 12/1977 | Hutchinson et al. .... 260/40 TN |
| 4,067,845 A | 1/1978 | Epel et al. ................ 260/40 R |
| 4,080,999 A | 3/1978 | Butlers et al. ................ 138/125 |
| 4,110,120 A | 8/1978 | Rosenberg et al. ................ 106/99 |
| 4,128,537 A | 12/1978 | Markiewitz ................ 528/49 |
| 4,169,186 A | 9/1979 | Tazaki et al. ................ 428/406 |
| 4,173,486 A | 11/1979 | Cheetham et al. ................ 106/99 |
| 4,252,696 A | 2/1981 | McQuarrie ................ 260/16 |
| 4,276,337 A | 6/1981 | Coonrod ................ 428/134 |
| 4,278,780 A | 7/1981 | Nishikawa et al. ........ 525/488 |
| 4,287,116 A | 9/1981 | Burns ................ 260/37 N |
| 4,296,020 A | 10/1981 | Magrans, Jr. ................ 260/37 N |
| 4,296,060 A | 10/1981 | Killmeyer et al. .......... 264/137 |
| 4,296,215 A | 10/1981 | Markiewitz ................ 525/28 |
| 4,301,201 A | 11/1981 | Stout ................ 428/36 |
| T101,401 I4 | 1/1982 | Zion ................ 264/25 |
| 4,312,162 A | 1/1982 | Medney ................ 52/309.16 |
| 4,351,364 A | 9/1982 | Cocks ................ 138/133 |
| 4,358,552 A | 11/1982 | Shinohara et al. .......... 523/443 |
| 4,394,338 A | 7/1983 | Fuwa ................ 264/135 |
| 4,440,593 A | 4/1984 | Goldsworthy ................ 156/441 |
| 4,445,957 A | 5/1984 | Harvey ................ 156/180 |
| 4,462,946 A | 7/1984 | Goldsworthy ................ 264/23 |
| 4,481,056 A | 11/1984 | Kuhl ................ 156/441 X |
| 4,564,540 A | 1/1986 | Davies et al. ................ 428/34 |
| 4,605,254 A | 8/1986 | Carmien ................ 294/57 |
| 4,612,744 A | 9/1986 | Shamash ................ 52/220 |
| 4,620,401 A | 11/1986 | L'Espérance et al. ......... 52/309 |
| 4,623,290 A | 11/1986 | Kikuzawa et al. ....... 411/908 X |
| 4,661,387 A | 4/1987 | Watanabe et al. ............. 428/36 |
| 4,681,722 A | 7/1987 | Carter et al. ................ 264/171 |
| 4,706,430 A | 11/1987 | Sugita et al. ............ 52/309.16 |
| 4,725,491 A | 2/1988 | Goldfein ................ 428/312.4 |
| 4,752,513 A | 6/1988 | Rau et al. ................ 428/91 |
| 4,804,427 A | 2/1989 | Paul et al. ................ 156/181 |
| 4,812,343 A | 3/1989 | Kiekhaefer et al. ........ 428/35.6 |
| 4,840,826 A | 6/1989 | Shirasaki et al. ........ 428/36.91 |
| 4,876,143 A | 10/1989 | Sugita et al. ................ 428/294 |
| 4,883,552 A | 11/1989 | O'Connor et al. .......... 156/180 |
| 4,892,600 A | 1/1990 | Beever ................ 156/180 |
| 4,892,764 A | 1/1990 | Drain et al. ................ 428/34.5 |
| 4,916,012 A | 4/1990 | Sawanobori et al. ........ 428/367 |
| 4,935,279 A | 6/1990 | Perko et al. ................ 428/74 |
| 4,942,190 A | 7/1990 | Murayama et al. ......... 523/400 |
| 4,958,961 A | 9/1990 | Herbst et al. ................ 405/260 |
| 4,992,229 A | 2/1991 | Beever ................ 264/280 |
| 4,997,703 A | 3/1991 | Gehrig ................ 428/283 |
| 5,011,872 A | 4/1991 | Latham et al. ................ 523/400 |
| 5,015,514 A | 5/1991 | Rinehart ................ 428/36.4 |
| 5,047,104 A | 9/1991 | Preis et al. ................ 156/86 |
| 5,077,113 A | 12/1991 | Kakihara et al. ............ 428/108 |
| 5,077,326 A | 12/1991 | Shibata et al. ............... 523/523 |
| 5,084,221 A | 1/1992 | Matsuno et al. ............ 264/103 |
| 5,084,222 A | 1/1992 | Glemet et al. ............... 264/136 |
| 5,098,496 A | 3/1992 | Breitigam et al. .......... 156/180 |
| 5,100,738 A | 3/1992 | Graf ................ 428/613 |
| 5,114,633 A | 5/1992 | Stewart ................ 264/23 |
| 5,120,380 A | 6/1992 | Strachan ................ 156/164 |
| 5,127,954 A | 7/1992 | Johnston et al. ............ 106/644 |
| 5,132,070 A | 7/1992 | Paul et al. ................ 264/258 |
| 5,139,843 A | 8/1992 | Murakami et al. .......... 428/116 |
| 5,139,845 A | 8/1992 | Beckerman et al. ........ 428/117 |
| 5,152,945 A | 10/1992 | Thiethener et al. ......... 264/136 |
| 5,156,787 A | 10/1992 | Booher ................ 264/135 |
| 5,166,230 A | 11/1992 | Stecker ................ 523/500 |
| 5,174,844 A | 12/1992 | Tong ................ 156/180 |
| 5,182,064 A | 1/1993 | Ishizuka et al. ............. 264/137 |
| 5,183,694 A | 2/1993 | Webb ................ 428/67 |
| 5,200,261 A | 4/1993 | Taguchi et al. ............. 428/245 |
| 5,211,669 A | 5/1993 | Bonnes et al. ............ 16/110 R |
| 5,212,234 A | 5/1993 | Van Gasse et al. ........... 525/43 |
| 5,234,333 A | 8/1993 | Rhodes, Jr. et al. ........ 425/391 |
| 5,234,590 A | 8/1993 | Etienne et al. ......... 210/321.61 |
| 5,271,193 A | 12/1993 | Olsen et al. ................ 52/19 |
| 5,290,407 A | 3/1994 | Syrett et al. ................ 204/147 |
| 5,322,582 A | 6/1994 | Davies et al. ................ 156/180 |
| 5,324,377 A | 6/1994 | Davies ................ 156/180 |
| 5,362,542 A | 11/1994 | Ozawa et al. ................. 428/70 |
| 5,405,668 A | 4/1995 | Sandt ................ 428/36.9 |
| 5,421,931 A | 6/1995 | Carmien ................ 156/172 |
| 5,437,899 A | 8/1995 | Quigley ................ 428/35.7 |
| 5,556,496 A | 9/1996 | Sumerak ................ 156/166 |
| 5,593,536 A | 1/1997 | Kaiser |
| 5,626,700 A | 5/1997 | Kaiser ................ 156/180 |
| 5,650,109 A | 7/1997 | Kaiser et al. ............... 264/136 |
| 5,702,816 A | 12/1997 | Kaiser ................ 428/375 |
| 5,716,487 A | 2/1998 | Sumerak ................ 156/359 |
| 5,763,042 A | 6/1998 | Kaiser et al. ................ 428/108 |
| 5,851,468 A | 12/1998 | Kaiser ................ 264/177.13 |
| 5,876,553 A | 3/1999 | Kaiser ................ 156/433 |
| 5,950,393 A | 9/1999 | Stecker ................ 52/740.1 |
| 5,966,895 A | 10/1999 | Stecker ................ 52/740.1 |
| 6,221,295 B1 * | 4/2001 | Kaiser et al. ................ 156/180 |
| 6,316,074 B1 * | 11/2001 | Kaiser et al. ................ 428/172 |
| 2002/0031664 A1 * | 3/2002 | Kaiser et al. ................ 428/371 |

FOREIGN PATENT DOCUMENTS

| | | |
|---|---|---|
| EP | 0 291 023 A2 | 5/1988 |
| EP | 0273 564 A | 7/1988 |
| EP | 0 402 309 A1 | 12/1990 |
| EP | 0502796 A1 | 9/1992 |
| EP | 0514718 A1 | 11/1992 |
| EP | 0 560 362 A2 | 9/1993 |
| EP | 0 579 163 A2 | 1/1994 |
| EP | 0 612 607 A1 | 8/1994 |
| EP | 0 733 465 A1 | 9/1996 |
| JP | 60-174646 A | 9/1985 |
| JP | 60229741 A | 11/1985 |
| JP | 61-235 115 A | 10/1986 |
| JP | 63-236848 A | 10/1988 |
| JP | U 05-19409 A | of 1993 |
| JP | 5-309750 | 11/1993 |
| WO | WO 96/00647 | 1/1996 |
| WO | WO 96/00824 | 1/1996 |
| WO | WO 96/21551 | 7/1996 |

* cited by examiner

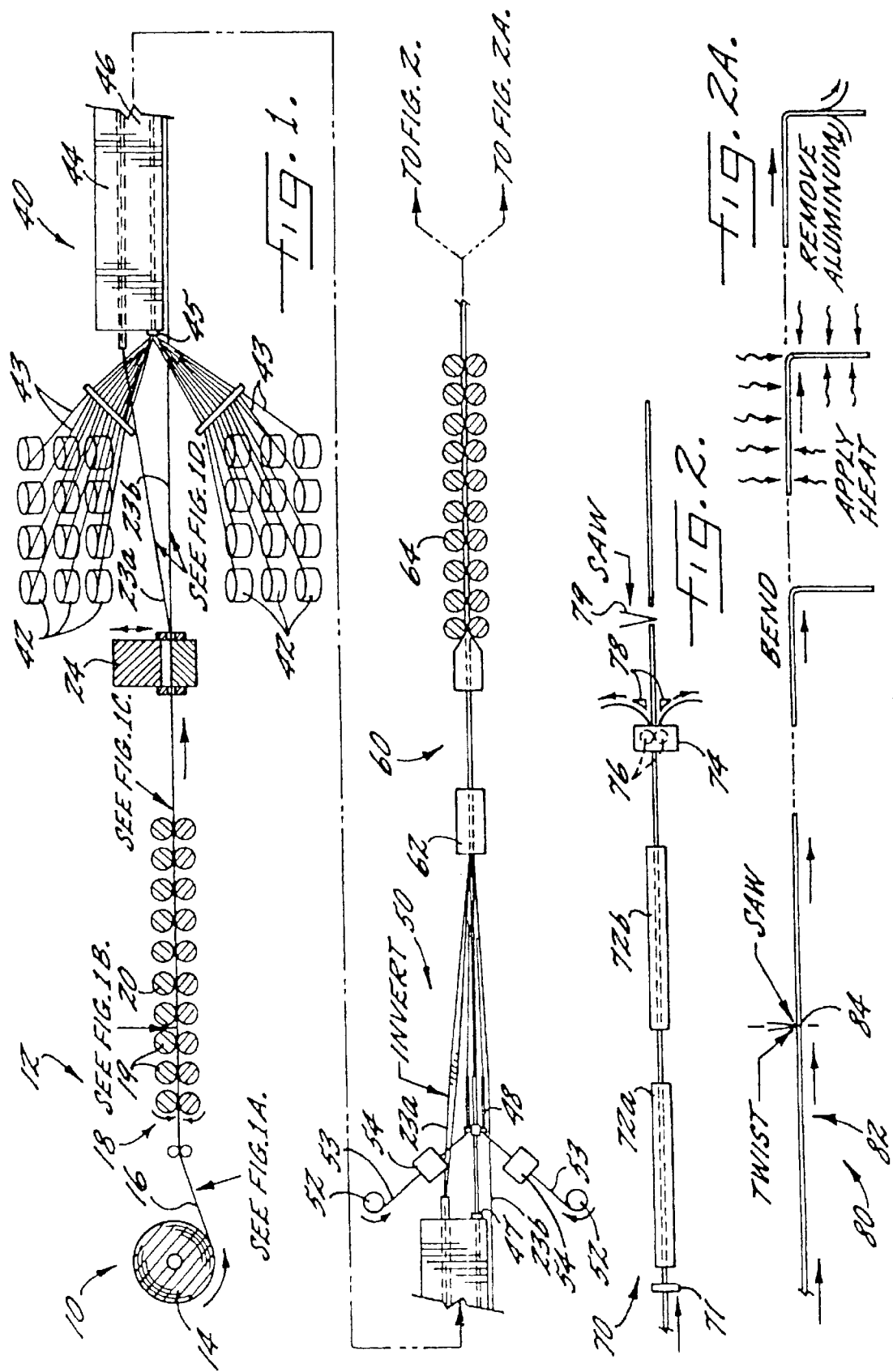

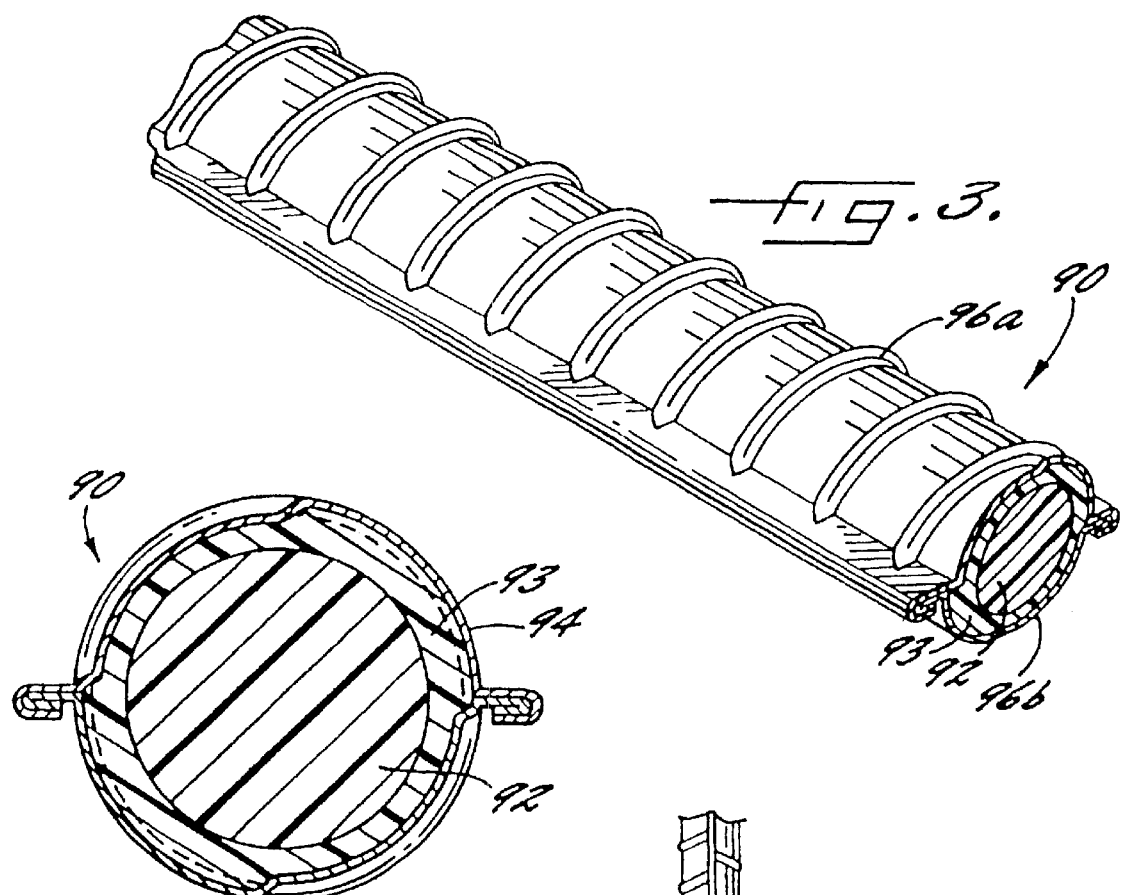
Fig. 3.
Fig. 4.
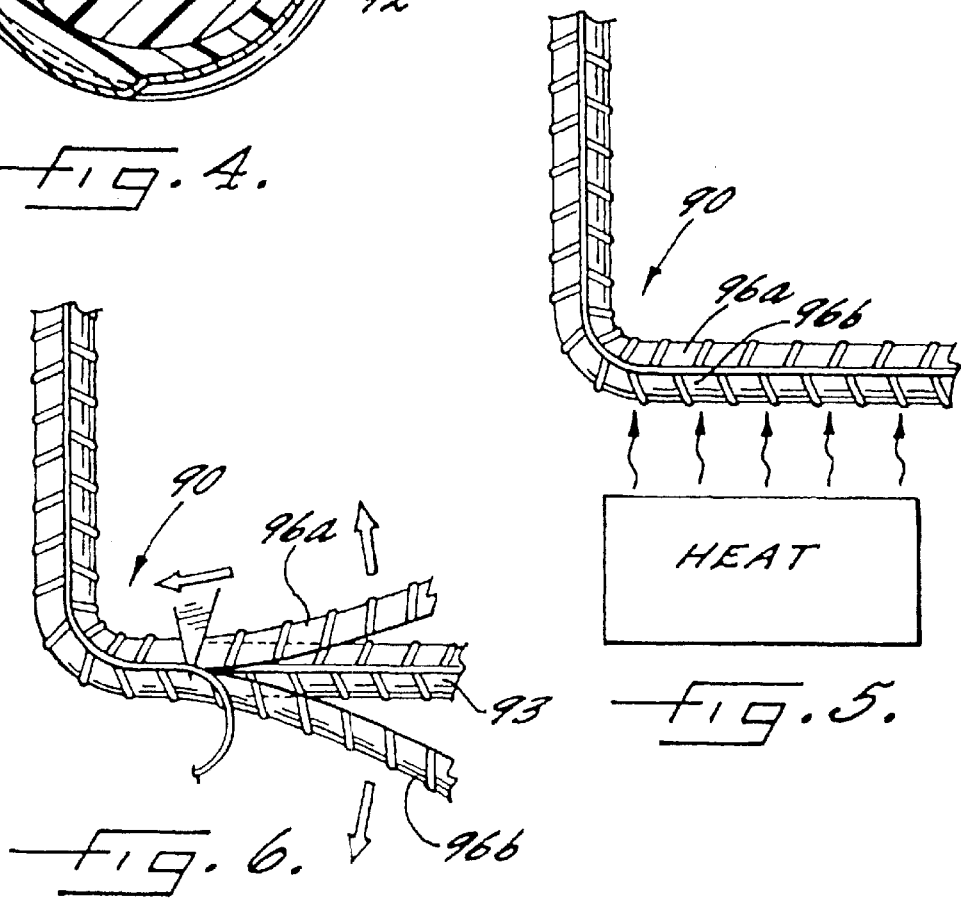
Fig. 5.
Fig. 6.

REINFORCED COMPOSITE PRODUCT AND APPARATUS AND METHOD FOR PRODUCING SAME

RELATED APPLICATION

This application claims priority from continuation application Ser. No. 09/344,873, filed Jun. 28, 1999, now U.S. Pat No. 6,221,295, which is a divisional of application Ser. No. 08/938,904, filed Sep. 26, 1997, now U.S. Pat. No. 6,316,074, which claims the benefit of U.S. Provisional Patent Application Serial No. 60/027,675, filed Oct. 7, 1996 for Reinforced Composite Product and Apparatus and Method for Producing Same, the disclosure of which is hereby incorporated herein by reference in its entirety.

FIELD OF THE INVENTION

The present invention is directed generally to reinforced composite articles, and more particularly to methods and apparatus for producing reinforced composite articles.

BACKGROUND OF THE INVENTION

Concrete and other masonry or cementitious materials have high compressive strength but relatively low tensile strength. When concrete is employed as a structural member, such as in a building, bridge, pipe, pier, culvert, or the like, it is conventional to incorporate reinforcing members to enhance the tensile strength of the structure. Historically, the reinforcing members are steel or other metal reinforcing rods or bars, i.e., "rebar". Such reinforcing members may be placed under tension to form prestressed concrete structures.

Although steel and other metals can enhance the tensile strength of a concrete structure, they are susceptible to oxidation. For example, ferrous metal rusts by the oxidation thereof to the corresponding oxides and hydroxides of iron by atmospheric oxygen in the presence of water. When it is poured, concrete is normally at a pH of 12 to 14 (i.e., at high alkalinity) due to the presence of hydroxides of sodium, potassium, and calcium formed during the hydration of the concrete. As long as a pH in this range is maintained, steel within the concrete is passive, which results in long-term stability and corrosion resistance.

Exposure to a strong acid, or otherwise lowering the pH of concrete, can cause steel contained in concrete to be corroded. For example, chlorine ions permeating into the concrete can cause corrosion. Sources of chlorine ions include road salt, salt air in marine environments, and salt-contaminated aggregate (e.g., sand) used in making the concrete. When the reinforcing steel corrodes, it can expand and create internal stresses in the concrete. These internal stresses can lead to cracking, and ultimately disintegration, of the concrete. Moreover, cracking and crumbling concrete exposes additional steel to atmospheric oxygen, water, and sources of chlorine ions.

Such structural damage has become a major problem in a wide variety of geographical areas. For example, bridges and other concrete building infrastructures in northern United States cities are constantly in need of repair because of the salting of roadways after winter snowstorms. Also, bridges leading to the Keys in Florida are continuously exposed to sea air; these bridges are regularly rebuilt because of the short lifespan of the concrete. As another example, buildings in Saudi Arabia and the Middle East, where concrete is typically made using the acidic sand of the region, are often in need of repair.

Various solutions to the corrosion problem of steel rebar have been offered; however, these solutions have been largely unsuccessful. Noncorrosive coatings on the concrete, the steel rebar, or both have been proposed. For example, U.S. Pat. No. 5,271,193 to Olsen et al. proposes a steel-reinforced concrete product, such as a manhole cover, having a coating of a corrosion-resistant gel coat layer and an intermediate layer of fiberglass between the concrete and the gel coat layer. The gel coat layer is described as being a "hardenable polymeric fluid material." U.S. Pat. No. 4,725,491 to Goldfein proposes steel rebar members having chemical conversion iron oxide coatings, such as black iron oxide. U.S. Pat. No. 5,100,738 to Graf proposes steel rebar having an outer layer of a synthetic material (e.g., epoxy resin) and an intermediate layer of aluminum or aluminum alloy between the outer layer and the steel. Unfortunately, in general these exemplary coatings tend to be expensive and have received mixed results and acceptance.

There has also been interest in replacing steel with various fiber-reinforced resins. For example, U.S. Pat. No. 5,077,133 to Kakihara et al. proposes an inner filament bundle layer spirally wound around a fiber-reinforced core, a plurality of intermediate filament bundles oriented axially along the core, and an outer filament bundle spirally wound around the core and the other bundles. U.S. Pat. No. 4,620,401 to L'Espérance et al. proposes a fiber reinforced thermosetting resin core and a plurality of continuous fibers helically wound around the core and impregnated with the thermosetting resin. The fiber-reinforced rods proposed in L'Espérance have manufacturing limitations and are difficult to manufacture continuously and rapidly. Additionally, the winding of filaments onto a core tends to reduce the tensile strength of the core and can cause wicking problems.

Other solutions include a corrosion-resistant fiber-reinforced rebar, disclosed in co-pending U.S. patent application Ser. No. 08/467,157, which comprises a fiber reinforced thermoset core and an outer cladding formed of sheet molding compound (SMC), and a three-layered reinforced resin-based composition, described in co-pending and co-assigned U.S. patent application Ser. No. 08/527,976, the disclosures of each of which are hereby incorporated herein by reference in their entireties. These materials are formed into rebar through modified pultrusion processes. Conventional pultrusion processes involve drawing a bundle of reinforcing material (e.g., glass filaments or fibers) from a source thereof, wetting the fibers and impregnating them (preferably with a thermosettable polymer resin) by passing the reinforcing material through a resin bath in an open tank, pulling the resin-wetted and impregnated bundle through a shaping die to align the fiber bundle and to manipulate it into the proper cross-sectional configuration, and curing the resin in a mold while maintaining tension on the filaments. Because the fibers progress completely through the pultrusion process without being cut or chopped, the resulting products generally have exceptionally high tensile strength in the longitudinal (i.e., in the direction the filaments are pulled) direction. Exemplary pultrusion techniques are described in U.S. Pat. No. 3,793,108 to Goldsworthy; U.S. Pat. No. to Fuway; 4,445,957 to Harvey; and U.S. Pat No. 5,174,844 to Tong. Exemplary pultruded articles include tool handles, mine shaft bolts, pipes, tubing, channel, beams, fishing rods and the like. In the patent applications cited above, a pultruded core is surrounded by a molded outer cladding layer formed of a reinforced resin.

Some rebar components are desirably curved or bent in order to follow the contour of the surrounding concrete structures. Unfortunately, one troublesome area for pultrusion processes is the manufacture of such nonlinear articles. Because a typical pultrusion process involves pulling material through an elongated heated die which at least partially cures, and therefore stiffens, the pultruded article, establishing bends or curves in the articles without sacrificing the advantages provided by pultrusion is problematic. As a result, conventional pultrusion processes for making linear rebar have proven to be particularly unsuitable for the production of nonlinear rebar.

SUMMARY OF THE INVENTION

In view of the foregoing, it is an object of the present invention to provide an apparatus and an associated method for producing nonlinear components with a pultrusion process.

It is also an object of the present invention to provide a pultruded nonlinear rebar component.

It is an additional object of the present invention to provide a composite material suitable for pultruding into a nonlinear rebar component.

It is yet another object to provide a method and associated apparatus for forming either linear or nonlinear components.

These and other objects are satisfied by the present invention, which provides a precured rebar product (or other reinforced article) that can be formed into either linear or nonlinear rebar as desired. The precured rebar product includes a core of reinforcing fibers impregnated with a resin, a cladding of reinforcing fibers and other reinforcing material (such as ceramic powder or spheres) impregnated with a resin, and an outer shell, typically formed of a material that is sufficiently ductile to be formed into a desired shape, yet is sufficiently rigid to retain its shape once it is formed (such as aluminum or steel). The core and cladding can be formed by conventional pultrusion-type techniques, but the resins of the core and cladding are not completely cured. They are encased in the shell material, which preferably includes deformations into which the resin of the cladding can flow to form the deformations of the rebar. Once the precured rebar product has been produced, it can then be formed into a desired shape (either linear or nonlinear) and can then be completely cured. After curing, the shells can be removed to provide a composite structural rebar component.

An apparatus suitable for producing the aforementioned precured rebar product includes means for forming a core having unidirectionally oriented impregnated fibers, means for forming a cladding having unidirectionally oriented fibers and additional reinforcing material, and means for encasing the core and cladding with a shell of a desired shape. It is preferred that both the core and cladding be formed by pulling the reinforcing fibers through respective resin baths, then forcing them through shaping fixtures. The shell can be applied by also forcing it through a sleeve through which the core and cladding also travel, then forming a seam in the shell material to prevent the resin from escaping. Preferably, if linear rebar is to be formed, the resin is cured "in-line" with the formation of the core and cladding. If, instead, nonlinear rebar is to be produced, it is preferred that the precured rebar product be cut to length and bent to the desired shape prior to curing.

BRIEF DESCRIPTION OF THE FIGURES

FIG. 1 is a schematic representation of the pre-cured rebar-forming apparatus of the present invention.

FIG. 2 is a schematic illustration of an apparatus employed to form linear rebar from pre-cured rebar product.

FIG. 2A is a schematic illustration of a method for forming nonlinear rebar from pre-cured rebar product.

FIG. 3 is a perspective sectional view of the pre-cured rebar product of the present invention.

FIG. 4 is an enlarged section view of the pre-cured rebar product of FIG. 3 showing the layers thereof.

FIG. 5 is a schematic representation of a pre-cured rebar product of the present invention bent to a desired configuration and cured.

FIG. 6 is a plan view of a cured bent rebar formed from the pre-cured rebar product of FIG. 5 illustrating how its aluminum sleeve can be removed.

DETAILED DESCRIPTION OF THE INVENTION

The present invention will now be described more particularly hereinafter with reference to the accompanying drawings, in which embodiments of the invention are shown. The invention can, however, be embodied in many different forms and should not be limited to the embodiments set forth herein; rather, these embodiments are provided so that this disclosure will be thorough and complete and will fully convey the scope of the invention to those skilled in this art.

Figure 1A:
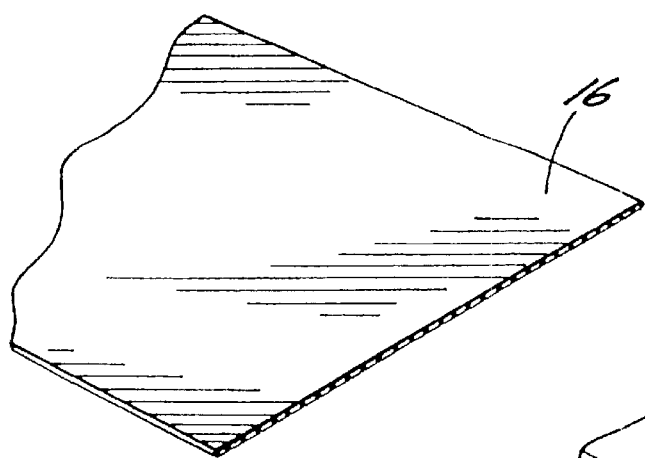
FIGS. 1A through 1D are cross-sections taken through the aluminum sheet in the positions indicated in FIG. 1.
Figure 1B:
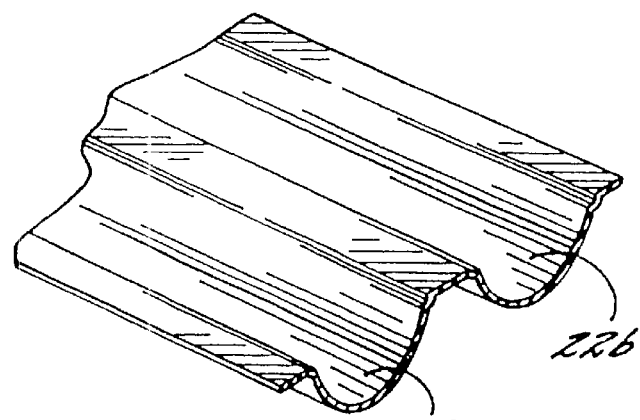
Figure 1C:
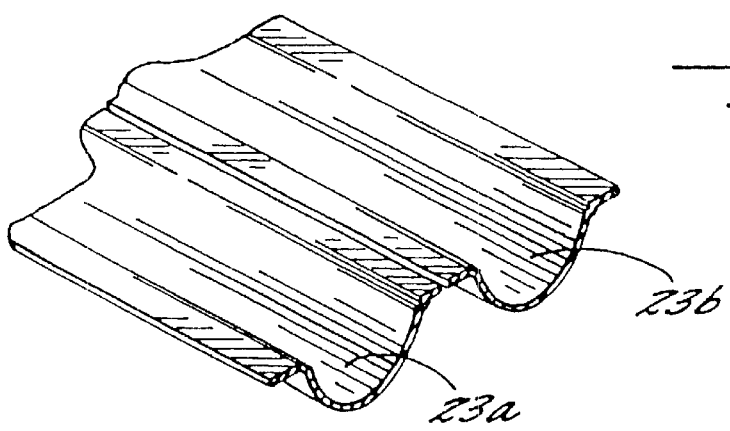
Figure 1D:
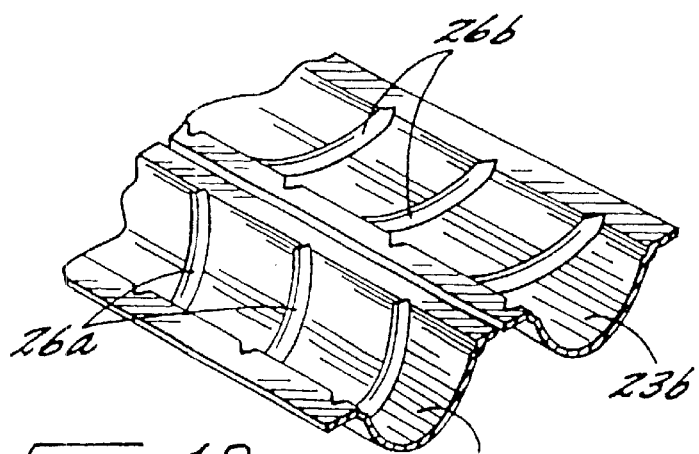

Referring now to the drawings, a precured rebar forming apparatus, designated generally at 10, is illustrated in FIG. 1. The apparatus 10 comprises an aluminum forming station 12, a core forming station 40, a cladding forming station 50, and a shell forming station 60. Material exits the shell forming station 60 as a precured rebar product 90 having a core 92, an outer cladding 93, and aluminum shells 96a, 96b (FIG. 3). The precured rebar product 90 can then be advanced either to a linear rebar curing unit 70 (FIG. 2) or a nonlinear rebar processing unit 80 (FIG. 2A). Each of these stations will be explained in greater detail hereinbelow.

The aluminum forming station 12 comprises an aluminum supply roll 14, a channel forming station 18, and a stamping press 24 (FIG. 1). The aluminum supply roll 14 supplies an elongate aluminum strip 16 (see FIG. 1A), which is advanced to the channel forming station 18. The channel forming station 18 comprises a series of forming roller pairs 19, wherein each of the roller pairs 19 defines therebetween a nip through which the aluminum strip 16 passes. The forming rollers 19 are configured such that, as the aluminum strip 16 passes through the nip, two longitudinally-extending channels 22a, 22b are formed therein (see FIG. 1B). A centrally located slitter roller pair 20 is configured to slit the aluminum strip 16 longitudinally into two adjacent strips 23a, 23b (see FIG. 1C).

Those skilled in this art will appreciate that, although aluminum is preferred for its formability and relatively low cost, other materials, such as steel, that are sufficiently ductile to take a desired configuration and sufficiently rigid to retain that shape when filled with fiber-reinforced resin can also be employed with the present invention. It is also preferred that the material that forms the shells 96a, 96b be able to withstand any elevated temperature required for curing of the resins comprising the precured rebar product 90.

Once the aluminum strips 23a, 23b with their channels 22a, 22b formed therein exit the channel forming station 18, they are directed to the stamping press 24. The stamping press 24, which preferably is a reciprocating-type press, stamps a pattern of female deformations 26a, 26b into the channels 22a, 22b (see FIG. 1D). Those skilled in this art will appreciate that other techniques for forming the aluminum shells 96a, 96b, such as roll-forming, can also be employed.

After the aluminum strips 23a, 23b exit the stamping press 24, the elevation of the aluminum strip 22a is increased, thereby separating it from the aluminum strip 23b (FIG. 1). The aluminum strips 23a, 23b remain separated from one another as they progress through the core forming station 40 and the cladding forming station 50.

The core forming station 40 (FIG. 1) comprises a plurality of reinforcing material creels 42 which supply reinforcing fibers 43, a resin bath 44 which contains an impregnating resin 46, and a shaping fixture 48. The reinforcing fibers 43 are drawn from the reinforcing creels 42 through a fiber inlet 45 positioned at the downstream end of the resin bath 44. The reinforcing fibers 43 travel through the resin 46 contained within the resin bath 44 and exit through a fiber outlet 47 located in the downstream end of the resin bath 44. The impregnated reinforcing fibers 43 then travel to and through the shaping fixture 48, wherein they are compressed into a desired cross-sectional shape (illustratively and preferably round) and excess impregnating resin is removed. The impregnated reinforcing fibers 43 will ultimately form the core 92 of the precured rebar product 90.

Other techniques for impregnating the reinforcing material with resin, such as direct injection, sleeve immersion, and the like, are also suitable for use with the present invention.

The resin material is preferably a thermosetting resin. The term "thermosetting" as used herein refers to resins which irreversibly solidify or "set" when completely cured. Suitable thermosetting "set" when completely cured. Suitable thermosetting resins include unsaturated polyester resins, phenolic resins, vinyl ester resins, polyurethanes, and the like, and mixtures and blends thereof. Particularly preferred thermosetting resins are ATLAC™ 31-727 and POLYLITE™ 31,041-00, available from Reichhold Chemicals, Inc., Research Triangle Park, N.C.

Additionally, the thermosetting resins useful in the present invention may be mixed or supplemented with other thermosetting or thermoplastic resins. Exemplary supplementary thermosetting resins include epoxies. Exemplary thermoplastic resins include polyvinylacetate, styrene-butadiene copolymers, polymethylmethacrylate, polystyrene, cellulose acetatebutyrate, saturated polyesters, urethane-extended saturated polyesters, methacrylate copolymers, polyethylene terephthalate (PET), and the like in a manner known to one skilled in the art.

Unsaturated polyester, phenolic and vinyl ester resins are the preferred thermosetting resins of the present invention. Suitable unsaturated polyester resins include practically any esterification product of a polybasic organic acid or anhydride and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and. anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The resin can be formed by the addition of recycled PET, such as from soda bottles to the base resin prior to polymerization. PET bottles can be ground and depolymerized in the presence of a glycol, which produces an oligomer. The oligomer can then be added to a polymerization mixture containing polyester monomer and polymerized with such monomer to an unsaturated polyester.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g.,2-butene-1,4-diol).

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as sisphenol-A, 4,4'-dihydroxydiphenyl-sulfone, 4,4'-dihydroxy biphenyl, 4,4'-dihydroxydi-phenylmethane, 2,2'-dihydroxydiphenyloxide, and the like.

Typically, the resin material also includes a vinyl monomer in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

In one embodiment, the thermosetting resin is thickened during the manufacturing process. The thickening can occur before, during, or after passing through the shaping fixture 48. The term "thickened" as used herein relates to an increase in viscosity of the resin such that the resin is transformed from a liquid to a nondripping paste form. This is often achieved by partial curing or so-called "B-staging" the resin. The term "partial curing" as used herein refers to incompletely polymerizing the resin by initiating polymerization and subsequently arresting the polymerization or controlling the polymerization so that full cure occurs at a later time. The resin being in a thickened or partially cured state, retains reactive sites, facilitates chemical bonding between the shaped core and the outer cladding.

Thickening or partial curing is achieved in a variety of ways. For example, the thermosetting resin may be thickened by the inclusion of a thickening agent. Suitable thickening agents are commonly known to those skilled in the art and include crystalline unsaturated polyesters, polyurethanes, alkali earth metal oxides and hydroxides, and polyureas. Often, the thickening agent cooperates with the conditions within a shaping fixture (such as the fixture 48) or a shaping die to thicken or partially cure the thermosetting resin. The conditions within the fixture which are required to effect the thickening or partial cure of the thermosetting resin are dependent upon the thickening agent employed, and are discussed in detail below.

Suitable resins employing a crystalline polyester thickening agent are described in U.S. Pat. No. 3,959,209 to Lake, the disclosure of which is incorporated herein by reference in its entirety. Typically, in the embodiment of the invention wherein the thermosetting resin is thickened with a crystalline polyester, the thermosetting resin comprises a thermosetting resin solubilized in a vinyl monomer. The crystalline polyesters useful in the present invention are generally ethylenically unsaturated, and react with the vinyl monomer, although one skilled in the art will appreciate that saturated crystalline polyesters may also be employed.

Methods of preparing crystalline polyester are well known in the art and include polyesterifying a symmetrical, aliphatic diol with fumaric acid, lower alkyl esters of fumaric acid, or symmetrical saturated diacids such as terephthalic acid, isophthalic acid and sebacic acid. Maleic anhydride or maleic acid or lower alkyl esters of maleic acid may also be used in the presence of an appropriate catalyst. Likewise, mixtures of fumaric acid or esters with maleic anhydride or maleic acid or its esters may also be used. Exemplary crystalline polyesters which may be employed in the present invention include polyfumarates of 1,6-hexanediol, neopentyl glycol, bis-(hydroxyethyl)resorcinol, ethylene glycol, 1,4-butanediol, 1,4-cyclohexanediol, 1,4-cyclohexanedi-methanol, or bis-(hydroxyethyl) hydroquinone.

The amount of crystalline polyester added to the thermosetting resin will vary depending upon the particular thermosetting resin employed. Typically, about 2 to about 80 percent by weight of crystalline polyester is required to thicken about 20 to about 98 percent by weight of a thermosetting resin.

The thermosetting resin may also be thickened with polyurethanes. Exemplary thermosetting resin thickened with a polyurethane are described in U.S. Pat. No. 3,886,229 to Hutchinson, the disclosure of which is incorporated herein by reference in its entirety. Typically, in the embodiment of the invention wherein the thermosetting resin is thickened with a polyurethane, the first resin material comprises a thermosetting resin solubilized in a vinyl monomer.

The polyurethanes useful in the present invention typically comprise the reaction product of a polyol and an isocyanate compound. The polyol may be saturated or unsaturated. Exemplary saturated polyols include ethylene glycol, propylene glycol, butane-1,4-diol, pentane-1,5-diol, hexane-1,6-diol, di(ethylene glycol), and di(propylene glycol). Polymers of glycols may also be employed. Exemplary polymers include poly(ethylene glycol), poly(propylene glycol), and poly(butylene glycol) and polyols of functionality greater than two, for example, glycerol, pentaerythritol, and trialkylol alkanes, e.g., trimethylol propane, triethylol propane, tributylol propane and oxyalkylated derivatives of said trialkylol alkanes, e.g., oxyethylated trimethylol propane and oxypropylated trimethylol propane.

In an embodiment wherein the thermosetting resin is thickened with a polyurethane including an unsaturated polyol, the unsaturated polyol crosslinks the urethane groups with the ethylenically unsaturated polyester and vinyl monomer of the thermosetting resin. Exemplary unsaturated polyols include polyesters, and vinyl esters. In one particularly preferred embodiment, the unsaturated polyol is a diester of propoxylated bisphenol-A.

The isocyanate compound employed to produce a polyurethane thicknering agent is typically a polyisocyanate. The polyisocyanate may be aliphatic, cycloaliphatic or aromatic or may contain in the same polyisocyanate molecule aliphatic and aromatic isocyanate groups, aliphatic and cycloaliphatic isocyanate groups, aliphatic cycloaliphatic and aromatic isocyanate groups or mixtures of any two or more polyisocyanates.

Exemplary polyisocyanates include 4,4'-diphenylmethane diisocyanate, 2,4-toluene diisocyanate, 2,6-toluene diisocyanate, isophorone diisocyanates (e.g., 3-isocyanatomethyl-3,5,5-trimethylcyclohexyl isocyanate), tetramethylene diisocyanate, pentamethylene diisocyanate, hexamethylene diisocyanate and octamethylene diisocyanate, and cycloaliphatic diisocyanates (e.g., 4,4'-dicyclohexylmethane diisocyanate).

The polyurethane may be reacted with the thermosetting resin according to any method known to those skilled in the art. The amount of polyurethane added to the first resin material will vary depending upon the particular thermosetting resin employed. Typically, the polyurethane comprises about 1 to about 60 percent by weight of the thermosetting resin.

The resin material may also be thickened using a polyurea thickening agent. Suitable formulation of resins thickened with polyurea are described in U.S. Pat. No. 4,296,020 to Magrans, Jr., the disclosure of which is incorporated herein by reference in its entirety. Typically, in the embodiment of the invention wherein the first resin material is thickened with polyurea, the first resin material comprises a resin solubilized in a vinyl monomer. The polyureas useful in the present invention typically comprise the product of polyamines with polyisocyanates. The polyisocyanates useful in the present invention include those described above with reference to urethane thickeners. Aliphatic, cycloaliphatic and aromatic polyamines free of ethylenic saturation are preferred polyurea precursors in that they form individual polyurea chains which are relatively crosslinked with the polymer chain formed by the copolymerization of the ethylenically unsaturated resin and monomers in solution therewith.

Aryl diamines and mixtures thereof such as metaphenylene diamine, paraphenylene diamine, naphthalene diamine, benzidene, bis(4-amino-phenyl)methane, 4,4'- diaminodiphenyl sulfone and halogenated derivatives such as those containing halogen on the benzenoid ring such as 3,3'-dichlorobenzidine, bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl)methane, hydrogenated methylene dianiline, diamino methane, and hydrogenated toluene diamine. The most useful of these are those that are liquids up to 75 EC. For those which are solids under these conditions, vinyl monomer solutions can be employed to form the homogeneous mix rapidly. In addition, other suitable amines include polyoxyalklene polyamines and cyanoalkylated polyoxyalklene polyamines having a molecular weight of about 190 to about 2,000 with a preferred range of about 190 to about 1,000. These amines are prepared according to the procedure outlined in a U.S. Pat. No. 4,296,020 to Magrans, Jr., the disclosure of which is hereby incorporated by reference in its entirety.

The resin material may also be thickened using alkali earth metal oxides or hydroxides. Typical thickeners of this type include calcium and magnesium oxides or hydroxides. The addition of these components to the first resin material will transform the liquid thermosetting resin to a semi-solid or solid form. The amount of oxide or hydroxide employed will vary depending upon the particular thermosetting resin employed. Typically, the alkali metal oxide or hydroxide comprises about 1 to about 15 percent by weight of the first resin material.

The resin material also may include an initiator system which cooperates with the conditions of the die to thicken the first resin material by partially curing the first resin material. The initiator system may be present in addition to any of the foregoing thickening agents, or as an alternative thereto.

The initiator system may comprise any number of polymerization initiators. Where multiple polymerization initiators are employed, the initiator system typically comprises polymerization initiators which can be activated by different conditions. For simplicity, where multiple polymerization initiators are employed, we refer to the polymerization initiator requiring the least activation energy as the "first polymerization initiator", and the initiator requiring the most activation energy as the "second polymerization initiator". Any practical number of polymerization initiators having activation energies between the first and second polymerization initiators may also be incorporated into the thermosetting resin matrix. It should not be implied from the use of the terms "first" and "second" polymerization initiator that the invention is restricted to the use of no more than two polymerization initiators.

Polymerization initiators which are useful in the practice of the present invention typically include free-radical initiators. Typical free-radical initiators include peroxy initiators. The reactivity of such initiators is evaluated in terms of the 10 hour half-life temperature, that is, the temperature at which the half-life of a peroxide is 10 hours. Suitable first polymerization initiators include polymerization initiators having a low 10 hour half-life, i.e., a more reactive peroxide initiator, as compared to initiators having a higher 10 hour half-life. Suitable second polymerization initiators include polymerization initiators having a higher 10 hour half-life than the 10 hour half-life of the polymerization initiator selected as the first polymerization initiator. Exemplary free-radical initiators useful in the present invention include diacyl peroxides, (e.g., lauroyl peroxide and benzoyl peroxide), dialkylperoxydicarbonates, (e.g., di(4-tert-butylcyclohexyl)peroxy dicarbonate), tert-alkyl peroxyesters, (e.g., t-butyl perbenzoate), di-(tert-alkyl) peroxyketals, (e.g., 1,1-di-(t-amylperoxy)cyclohexane), di-tert-alkyl peroxides, (e.g., dicumyl peroxide), azo initiators, (e.g., 2,2'-azobis(isobutyronitrile), ketone peroxides, (e.g., methylethylketone peroxide and hydroperoxides).

In an embodiment wherein the initiator system comprises only one polymerization initiator, the resin material preferably includes a vinyl monomer. The vinyl monomer and the polymerization initiator may be independently activated under different conditions thus permitting the partial polymerization of the resin material.

The amount of polymerization initiator(s) used is dependent upon the number of initiators employed, the conditions at which the selected initiators will initiate polymerization, and the time desired for partial curing. Typically the amount of time desired for partial curing is a short period, i.e., less than 3 hours, and often less than 1 hour. In the embodiment wherein the first resin material includes only one polymerization initiator, the amount of the initiator is typically about 0.1 to about 10 percent by weight of the first resin material. In the embodiment wherein the first resin material includes two polymerization initiators, the amount used is about 0.01 to about 4 percent by weight of the first polymerization initiator and about 0 to about 5 percent by weight of the second polymerization initiator based on the weight of the resin material.

The initiator system and amounts of each polymerization initiator incorporated into the first resin material should be such that as the resin impregnated reinforcing fiber is shaped in the shaping fixture 48, the conditions therein are sufficient to activate at least one, but preferably not all polymerization initiators, resulting in the partial polymerization of the first resin material. Typically, in the embodiment wherein the initiator system comprises only one polymerization initiator, the resin impregnated reinforcing fiber is shaped through a fixture within which the reinforcing fiber is subjected to sufficient heat to activate the polymerization initiator without attaining the self-polymerization temperature of the first resin material. In an embodiment wherein multiple polymerization initiators are employed, typically the resin impregnated reinforcing fiber is shaped in the shaping fixture 48 within which the reinforcing fiber is subjected to sufficient heat to activate at least one, and preferably the first, polymerization initiator to partially cure the first resin material.

The resin material may be thickened using only one of the foregoing methods or by using two or more methods in combination. Any combination of the foregoing thickening methods may be used to prepare the inner core. In embodiments wherein multiple methods of thickening the first resin material are employed, the conditions within the die which are sufficient to thicken the resin material will depend on the particular combination of thickening methods employed. The necessary conditions within the die which will effect thickening will be readily determinable by one skilled in the art.

One particularly preferred resin combination includes a resin, a polycarbodiimide, and a peroxide curing agent. Numerous resins may be used including, for example, saturated and unsaturated polyesters, vinyl esters, styrenic resins, acrylic resins, and butadiene resins. Such resins may have hydroxyl, carboyl, amino, thiol, phenol, or other groups containing reactive hydrogens. An unsaturated polyester resin is preferably used.

The unsaturated polyester resin is formed from conventional methods as described hereinabove. The polycarbodiimides may be formed from various suitable reactions involving appropriate and known components. The polycarbodiimides can include aliphatic, cycloaliphatic, or aromatic polycarbodiimides. Polycarbodiimides can be formed, for example, by polymerizing a diisocyanate or a mixture of diisocyanates in the presence of an appropriate ring or linear inorganic oxide catalyst. The formation of polycarbodiimides utilizing such a reaction is described in U.S. Pat. No. 5,115,072 to Nava et al., the disclosure of which is incorporated by reference herein in its entirety. The diisocyanates which can be used include aliphatic, cycloaliphatic, araliphatic, aromatic and heterocyclic diisocyanates of the type described, for example, by W. Siefken in Justus Liebigs Annalen der Chemie, 562, pages 75 to 136, (1949) for example, those corresponding to the following formula:

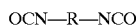

wherein R is a difunctional aliphatic, cycloaliphatic, aromatic, or araliphatic radical having from about 4 to 25 carbon atoms (preferably between about 4 and 15 carbon atoms) and is free of any group that can react with isocyanate groups.

Suitable diisocyanates include, for example, 1,4-tetramethylene diisocyanate; 1,4and/or 1,6-hexamethylene diisocyanate; 1,12-dodecane diisocyante; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane; 2,4- and 2,6-hexahydrotolylene diisocyanate and mixtures of these isomers; hexahydro-1,3- and/or 1,4-phenylene diisocyanate; per-hydro-2,4'- and/or 4,4'-diphenyl methane diisocyanate; 1,3- and 1,4-phenylene diisocyanate; 2,4- and 2,6-tolylene, diisocyanate and mixtures of these isomers; diphenyl methane-2,4' and/or 4,4'-diisocyanate; naphthalene-1,5-diisocyanate; 1,3- and 1,4-xylylene diisocyanates, 4,4'-methylene-bis(cyclohexyl isocyanate), 4,4'-isopropyl-bis-(cyclohexyl isocyanate), 1,4-cyclohexyl diisocyanate and 3-isocyanatomethyl-3,5,5-trimethylcyclohexyl isocyanate (IPDI); 1-methyoxy-2,4-phenylene diisocyanate; 1-chloropyhenyl-2,4-diisocyante; p-(1-isocyanatoethyl)-phenyl isocyanate; m-(3-isocyanatobutyl)-phenyl isocyanate, and 4-(2-isocyanate-cyclohexyl-methyl)-phenyl isocyanate, and mixtures thereof.

Formation of the polycarbodiimide may take place by reacting a diisocyanate with a monomeric component, preferably a monoalcohol such as ethanol, propanol, pentanol, hexanol, octanol, ethylhexyl alcohol, and the like. Unsaturated monomers having active hydrogens, may be also be used including, for example, acrylic acid, methacrylic acid, acetic acid, phenylacetic acid, phenoxyacetic acid, propionic acid, hydrocynnamic acid, and the like. Hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and the like may also be employed. Mixtures of any of the above may be used. Polyols can be additionally be used including, but not limited to, ethylene glycol; 1,2and 1,3propylene glycol; 1,4and 2,3-butylene glycol; 1,5-pentane diol; 1,6-hexane diol; 1,8-octane diol; neopentyl glycol; 1,4-bis-hydroxymethyl cyclohexane, and the like. Mixtures of any of the above may be used. It should be noted that the polycarbodiimide may be formed from the diisocyanate without reaction with the monomeric component.

The catalyst used in the reaction between the monomeric component and diisocyanate includes, for example, an organo tin catalyst such as dibutyl tin diacetate, or dibutyl tin di-2-ethylhexoate, dibutyl tin dilaurate, dibutyl tin oxide or tertiary amines, such as triethylamine, tributylamine, triethylenediamine tripropylamine, and the like. Additionally, other catalysts which may be used in forming the polycarbodiimide including, for example, phospholine-1oxides and phospholine-1-sulfides. A preferred catalyst is 3-methyl-1-phenyl-3-phospholine oxide.

A catalyst such as organic peroxide initiator is employed to facilitate curing of the chemical thickening composition. Such catalysts are described in U.S. Pat. Nos. 4,062,826; 4,073,828; and 4,232,133, the disclosures of which are incorporated by reference herein in their entirety. Exemplary organic peroxide initiators include, but are not limited to, cumene hydroperoxide, 2,5-dimethylhexane-2,5-dihydroperoxide, tert-butyl peroxybenzoate, di-tert-butyl perphthalate, dicumylperoxide, 2,5-dimethyl-2,5-bis(tert-butylperoxy)hexane, 2,5-dimethyl-2,5-bis (tert-butylperoxy) hexyne 3, bis (tert-butylperoxyisopropyl) benzene di-tert-butyl peroxide, 1,1-di(tert-amylperoxy)-cyclohexane, 1,1-di-(tertbutylperoxy)-3,3,5-trymethylcyclohexane, 1,1-di-(tert-butylperoxy)-cyclohexane, 2,2-di-(tert-butylperoxy)butane, n-butyl 4,4-di-(tert-butylperoxy)-valerate, ethyl 3,3-di-(tert-amylperoxy)-butyrate, ethyl 3,3-di-(tert-butylperoxy)-butyrate and the like. Mixtures of the above may be used.

The chemical thickening composition may be formed by first placing a resin, preferably an unsaturated polyester, in a container along with a peroxide catalyst with the two being mixed for approximately 15 minutes. A polycarbodiimide is then added and mixed in for approximately 10 minutes. The resulting resin composition can then be added to reinforcing material 43 in the resin bath 44.

The reinforcing fibers 43, which are impregnated with the resin 46, can comprise up to 75 percent fibers, and preferably comprises at least about 40 percent of the core by weight. Additionally, the reinforcing fibers 43 may be circumferentially wound with additional reinforcing fibers or reinforcing mat to provide additional strength thereto and to enhance the mechanical bonding of the core 92 to the outer cladding 93.

The reinforcing fibers 43 are preferably glass fibers. Glass fibers are readily available and low in cost. A typical glass fiber is electrical grade E-glass. E-glass fibers have a tensile strength of approximately 3450 MPa (practical). Higher tensile strengths can be accomplished with S-glass fibers having a tensile strength of approximately 4600 MPa (practical). The glass fiber can be treated to provide other properties such as corrosion resistance. Other suitable reinforcing fibers include carbon, metal, high modulus organic fibers (e.g., aromatic polyamides, polybenzimidazoles, and aromatic polyimides), and other organic fibers (e.g., polyethylene, liquid crystal and nylon). Blends and hybrids of the various fibers can be used.

Turning again to FIG. 1, simultaneous with the formation of the core 92, the aluminum strips 23a, 23b also pass through the core forming station 40. The aluminum strip 23b passes beneath the resin bath 44, while the aluminum strip 23a passes through a sleeve 49 that extends longitudinally through the resin bath 44 above the level of the resin 46. Of course, the aluminum strips 23a, 23b can also follow alternative paths around the resin bath 44.

Once they have exited the core forming station, the impregnated reinforcing fibers 43 and the aluminum strips 23a, 23b then pass to the cladding forming station 50. The cladding forming station 50 comprises a plurality (two are shown) of creels 52 which supply reinforcing fibers 53, and further comprises a pair of resin baths 54. The reinforcing fiber 53 are unwound from the creels 52, are impregnated by resin (not shown) located in the resin bath 54, and pass downstream therefrom. The resin baths 54 are positioned so that half of the impregnated reinforcing fibers 53 travel above the impregnated core fibers 43, and the remaining impregnating reinforcing fibers 53 pass below the core fibers 43. The reinforcing fibers 53 and the resin subsequently form the outer cladding 93. As described above for the core 92, alternative techniques for impregnating the reinforcing fibers 53 with resin, such as injection and sleeve immersion, can also be employed to form the outer cladding 93.

The resin material of the cladding layer 93 is typically a thermosetting resin, and is generally selected from the group consisting of unsaturated polyester resins, vinyl ester resins, vinyl urethane resins, vinyl isocyanurate resins and the like and mixtures or blends thereof. It is preferred that the resin be corrosion-resistant.

Suitable unsaturated polyester and vinyl esters include those previously described hereinabove. One particularly preferred thermosetting resin is a vinyl maleate urethane. Suitable vinyl urethane resins include those described in U.S. Pat. No. 3,929,929 to Kuehn, the disclosure of which is incorporated herein Kuehn, the disclosure of which is incorporated herein by reference in its entirety. The vinyl urethanes proposed in Kuehn are prepared by reacting a diol, a polyisocyanate, and a hydroxyl-terminated ester of acrylic or methacrylic acid. Exemplary vinyl urethanes include DION™ 31038-00 and ATLAC™ 580-05A, both of which are available from Reichhold Chemicals, Inc., Research Triangle Park, N.C.

The vinyl isocyanurate resins which are useful in the present invention include those proposed in U.S. Pat. No. 4,128,537 to Markiewitz, the disclosure of which is incorporated herein by reference. The ethylenically unsaturated isocyanurates proposed in Markiewitz are prepared by reacting a polyisocyanate with a monohydric alcohol to form a urethane, and then trimerizing the urethane to form an ethylenically unsaturated isocyanurate. An exemplary vinyl isocyanurate includes ATLACT™ 31631-00 available from Reichhold Chemicals, Inc., Research Triangle Park, N.C.

The resin material of the cladding layer 93 may also include other additives commonly employed in resin compositions, the selection of which will be within the skill of one in the art. For example, the cladding resin material may include reinforcing fillers, particulate fillers, selective reinforcements, thickeners, initiators, mold release agents, catalysts, pigments, flame retardants, and the like, in amounts commonly known to those skilled in the art. Any initiator may be a high or a low temperature polymerization initiator, or in certain applications, both may be employed. Catalysts are typically required in resin compositions thickened with polyurethane. The catalyst promotes the polymerization of NCO groups with OH groups. Suitable catalysts include dibutyl tin dilaurate and stannous octoate. Other commonly known additives which may desirably be incorporated into the Another particularly preferred resin combination is that described hereinabove that includes a resin, a polycarbodiimide, and a peroxide curing agent. When this composition is employed in both the core 92 and cladding 93, the resulting product can partially cure without the addition of heat. As a result, deformations formed in the cladding remain formed (rather than receding back into the cladding 93) until full cure is effected.

Particulate fillers that can be used with the resin of the cladding 93 typically include inorganic fillers and organic fillers. Exemplary inorganic fillers include ceramic, glass, carbon-based inorganic materials such as carbon black, graphite, and carbonoyl iron, cermet, calcium carbonate, aluminum oxide, silicon dioxide, oxides of nickel, cobalt, iron (ferric and ferrous), manganese, and titanium, perlite, talc (hydrous magnesium silicate), mica, kaolinite, nitrides of boron and aluminum, carbides of silicon, boron, and aluminum, zircon, quartz glass, aluminum hydroxide, gypsum, magnesite, ferrite, molybdinum disulfide, zinc carbonate, and blends thereof. Exemplary organic fillers include aramid and polyethylene terephthalete. These and other exemplary reinforcing materials are described in U.S. Pat. No. 4,278,780 to Nishikawa et al.; U.S. Pat. No. 4,358,522 to Shinohara et al.; U.S. Pat. No. 5,011,872 to Latham et al.; U.S. Pat. No. 5,234,590 to Etienne et al.; and U.S. Pat. No. 4,947,190 to Murayama et al. Preferably, the resin includes a ceramic filler; i.e., a material that is the product of heated earthy raw materials in which silicon with its oxide and silicates, such as calcium silicate, wollastonite, beryl, mica, talc, and clays such as kaolinite, occupy a predominant position. See Hawley's Condensed Chemical Dictionary at 240 (11th ed. 1987). A particularly preferred ceramic filler is KZ Ceramic Powder, a proprietary ceramic powder available from Ceramic Technologies Corporation, Rowley, Iowa. In one embodiment, the ceramic filler is advantageously blended with a calcium carbonate filler in a 3:1 blend.

The filler can be supplied in many forms, including powder, fiber, sphere, bead, particle, flake, lamella, and the like. If a ceramic filler is used, preferably the filler is a powder sized between about 0.0001 and 0.003 of an inch, and more preferably is a powder sized between about 0.001 and 0.0015 inches. It is also preferred that such a ceramic filler comprise between about 10 and 50 percent, and more preferably between about 30 and 50 percent, by weight of the outer cladding layer 93. Preferably, the resin includes ceramic spheres, which assist the reinforcing fibers 53 in reinforcing the deformations 94 of the cladding 93.

The cladding layer 93 is reinforced with reinforcing fibers 53 such as those previously described. In one embodiment, the cladding layer 93 is reinforced with between about 30 to 70 percent by weight of reinforcing material. Like the reinforcing material described hereinabove for the core, the reinforcing fibers of the cladding layer 93 are preferably glass fibers, as they are readily available and low in cost. Other suitable reinforcing fibers include carbon, metal, high modules organic fibers (e.g., aromatic polyamides, polybenzimidazoles, and aromatic polyimides), and other organic fibers (e.g., polyethylene, liquid crystal and nylon). Blends and hybrids of the various fibers can be used. It is preferred that a "bloomed" fiber be employed, as such fibers can increase the amount of resin impregnating the reinforcing fiber 53.

Preferably, the reinforcing fibers in the cladding 93 are unidirectional, but a fibrous mat is also contemplated. Unidirectional fibers should be oriented to be substantially parallel with the longitudinal axis of the rebar 10. In this configuration, the fibers can enhance the tensile and flexural strength and rigidity of the rebar 10.

Typically, the cladding layer 93 should have a thickness of between about 0.01 and 0.2 inches, and preferably has a thickness of between about 0.025 and 0.100 inches.

Returning to FIG. 1, at the same time the reinforcing fibers 53 pass through the resin, the aluminum strips 23a, 23b also travel through the cladding forming station 50. The aluminum strip 23b passes below the lower half of the reinforcing fibers 53 and retains its original orientation, with the channel 22b formed therein having its open end facing upwardly. However, as the aluminum strip 23a passes through the cladding forming station 50, it is inverted by a series of slots in aligning cards (not shown) to take an orientation in which the channel 22a has its open end facing downwardly. The aluminum strip 22a remains above the upper half of the reinforcing material 53. Other techniques for inverting the strip 23a will also be known to those skilled in this art.

The aluminum strips 23a, 23b, the impregnated reinforcing fibers 43, and the impregnated reinforcing fiber 53 are combined in the shell forming station 60 (FIG. 1). The shell forming station 60 comprises an accumulation sleeve 62 and a seaming unit 64. In the accumulation sleeve 62, the aluminum strip 23a, 23b are forced together such that their respective channels 22a, 22b are laterally aligned to form an elongate cavity therein. Within the cavity are the reinforcing fibers 43, which form the core 92 of the precured rebar product 90, and the reinforcing fibers 53, which form the outer cladding 93 of the precured rebar product 90. The aluminum strips 23a, 23b and their contents then travel to the seaming unit 64, where the edges of the aluminum strip 23a, 23b are folded inwardly to form a securing seam (see FIG. 4).

At this point in the process, the precured rebar product 90 has been formed (FIGS. 3 and 4). As stated above, the precured rebar product 90 includes a core 92 (formed of the impregnated reinforcing fibers 43), a cladding 93 (formed of the impregnated reinforcing fibers 53) and aluminum shells 96a, 96b. Deformations 94, which are included in rebar to aid with the bond between the rebar and a concrete structure, are formed within female deformations 26a, 26b within the aluminum shelves 96a, 96b.

Those skilled in this art will appreciate that the deformations 94 in the rebar product 90 can take any number of configurations known to those skilled in this art to improve the mechanical bond between the rebar 90 and a surrounding concrete structure. Also, it should be evident that the product produced by the apparatus 10 need not be rebar, but can be virtually any elongate reinforced composite article. Exemplary alternative articles include tool handles, mine shaft bolts, pipes, tubing, channel, beams, fishing rods and the like.

The precured rebar product 90 can be employed to form linear rebar (in the linear rebar curing unit 70) or nonlinear rebar (in the nonlinear rebar processing station 80). Linear rebar can be formed through the process illustrated schematically in FIG. 2. Nonlinear rebar can be formed through the process illustrated schematically in FIG. 2A. Each of these process are described separately hereinbelow.

The linear rebar curing unit 70 (FIG. 2) includes a pulling unit 71, a pair of heating chambers 72a, 72b, and a stripping unit 74. The linear rebar curing unit 70 should be employed at the downstream end of the shell forming station 60 such that the reinforcing fibers 43 and 53 extend continuously into and are pulled by the pulling unit 71. This configuration maintains tension in the reinforcing fibers 43, 53, which significantly improves the mechanical properties of the rebar forming therefrom. The precured product travels through heating chambers 72a, 72b, which cure the resins impregnated in the reinforcing fibers 43, 53. The product then travels to the stripping unit 74, which includes blades 76 for removing seams from the aluminum shelves surrounding the material and fixtures 78, which strip the aluminum from the rebar product. The cured, stripped product is then cut to a desired length with a saw 79.

If nonlinear rebar is to be formed from the precured rebar product, material exiting the shell forming station 60 it is first conveyed to an end finishing unit 82, wherein localized points on the product which represent the end of the finished product are twisted. This twisting action retains the reinforcing fibers 43, 53 in tension. As the ends are twisted, a saw 84 which cuts the product 90 to the desired length at the twisted ends. The twisting and cutting of the ends can occur simultaneously, such as with a pinching action, or can be separate steps. The precured, precut product can then be formed to a desired shape either within the factory or at a remote site by bending the product 90 to a desired shape around a fixture, heating the product to cure it (FIG. 5) then stripping the aluminum shells 96a, 96b therefrom (FIG. 6).

The foregoing discussion demonstrates that the apparatus of the present invention can be used to produce both linear and nonlinear reinforced composite articles as desired. The manufacture of the precured product enables the manufacturer to produce whichever product is desired as the need arises without investing in multiple pultrusion lines, thereby reducing the cost of production.

In the drawings and specification, there have been set forth preferred embodiments of the invention and, although specific terms are employed, the terms are used in a generic and descriptive sense only and not for purposes of limitation.

That which is claimed is:

1. A method for forming a rebar product comprising a core and a cladding layer, comprising the steps of:

pultruding a first reinforced material to form an inner core;

forming a cladding layer comprising a resin material over said inner core;

forming two longitudinally extending channels from a malleable material layer, wherein one of the longitudinally extending channels is configured to define a first malleable shell portion and the other is configured to define a matable second malleable shell portion;

positioning the first and second shell portions on opposing sides of said core and cladding layers; then enclosing said core and cladding layer with said first and second shell portions to form a malleable outer shell therearound with the cladding layer flowing into the first and second shell portions; and attaching said shell portions together to form the rebar product;

wherein said malleable outer shell is sufficiently ductile to take on a shell configuration in advance of said enclosing step.

2. A method according to claim 1, further comprising the steps of heating the rebar product to cure said inner core and said cladding layer and removing the first and second shell portions from the rebar product after said heating step.

3. A method according to claim 1, further comprising the step of forming a desired deformation pattern into the malleable shell portions before said enclosing step.

4. A method according to claim 3, wherein in said enclosing step, said cladding layer flows into the deformations of the malleable outer shell to form deformations onto the rebar product.

5. A method according to claim 1, wherein after said enclosing step the malleable outer shell defines a linear elongate cavity which encases the outer cladding and core layers therein.

6. A method according to claim 5, further comprising the step of shaping the rebar product from a linear configuration into a non-linear configuration after said attaching step.

7. A method according to claim 6, wherein said shaping step comprises bending the rebar product while the rebar product resides in the outer shell.

8. A method according to claim 6, wherein said shaping step comprises bending the outer shell and rebar product about a fixture such that the rebar product takes on a desired non-linear shape.

9. A method according to claim 6, further comprising the step of cutting the rebar product held in the outer shell into a desired length prior to said shaping step.

10. A method according to claim 1, further comprising the steps of cutting the rebar product and outer shell into a desired length after said attaching step and then bending the rebar product into a desired shape while the rebar product is held in the outer shell.

11. A method according to claim 1, further comprising the step of heating the rebar product held in the outer shell after said cutting and bending steps to cure the inner core and cladding layer.

12. A method according to claim 11, further comprising the step of stripping the outer shell from the rebar product after said heating step.

13. A method according to claim 12, wherein said enclosing and attaching steps are carried out at a first site and said curing and stripping steps are carried out at a second site remote from the first site.

14. A method according to claim 1, wherein said attaching step is carried out to secure said shell portions together so as to retain the flowable resin of the cladding layer within the shell portions.

15. A method according to claim 14, wherein said attaching step comprises folding edges of the first and second shell portions to define longitudinally extending securing seams.

16. A method according to claim 4, further comprising the step of removing said outer shell after said the deformations are formed onto the rebar product.

17. A method according to claim 6, wherein after said removing step, the shell deformation patterns remain on the outer shell and a corresponding pattern of deformations are formed in the outer cladding layer.

18. A method according to claim 1, wherein said channel forming step comprises forming a continuous supply of planar metallic material into the first and second outer shell portions.

19. A method according to claim 18, wherein said channel forming step comprises the steps of:

providing a roll of elongate aluminum strip material;

forming two longitudinally extending channels into the elongate aluminum strip material;

dividing the two longitudinally extending channels of the elongate aluminum strip material into two adjacent strips; and introducing deformations into the two strips after said dividing step.

20. A method according to claim 19, wherein said channel forming step further comprises the steps of:

elevating a first one of the two strips after said introducing step, thereby separating it from the other strip such that the strips remain separated from one another during said core pultruding step and said cladding layer forming step.

21. A method according to claim 3, wherein said first and second outer shell portions together define an enclosed elongate cavity therebetween for holding said core and cladding layers therein.

22. A method according to claim 1, wherein said first and second outer shell portions form an outer shell that defines an elongate cavity for holding said core and cladding layers therein, and wherein said channel forming step further comprises the steps of:

forming the two longitudinally extending channels from a single strip of material;

subsequently longitudinally slitting the single strip of material to provide two adjacent strips;

separating the two strips from one another during said core pultruding and cladding layer forming steps; and forcing the two strips together such that their respective channels are laterally aligned to form the elongate cavity therebetween.

23. A method according to claim 1, further comprising the steps of:

forming deformation patterns onto said first and second outer shell portions before said enclosing step, wherein after said enclosing step, said cladding material flows into the shell deformation patterns.

24. A method according to claim 1, further comprising the steps of:

curing the rebar product a final cure state after said attaching step;

stripping said outer shell from the rebar product after said final cure state; and repeating said curing and stripping steps for a plurality of rebar products.

25. A method for forming a non-linear rebar product, comprising the steps of:

pultruding a first reinforced material to form an inner core;

forming a cladding layer comprising a flowable resin material over said inner core;

positioning first and second shell portions on opposing sides of said core and cladding layer;

enclosing said core and cladding layer within said first and second shell portions to form a rebar product; and shaping said rebar product into a desired non-linear configuration after said enclosing step.

26. A method according to claim 25, further comprising the step of attaching said shell portions to secure the first and second shell portions together.

27. A method according to claim 26, wherein the cladding layer comprises a second reinforced material, said method further comprising the step of curing said rebar product after said attaching and shaping steps, wherein said shaping step includes shaping the rebar product such that it is non-linear in at least one of the longitudinal and transverse directions.

28. A method according to claim 26, further comprising, in advance of said positioning step, the step of forming a malleable material into two longitudinally extending channels which are shaped into a desired shell configuration to define the first and second shell portions.

29. A method according to claim 26, wherein said cladding layer comprises reinforcing fibers, and wherein said cladding resin layer material flows into the first and second shell portions in said enclosing step.

30. A method according to claim 29, wherein said attaching step is carried out to secure said first and second shell portions together so as to retain the flowable resin in the attached shell portions.

31. A method according to claim 30, wherein said attaching step comprises folding edges of the first and second shell portions to define a longitudinally extending securing seam.

32. A method according to claim 26, further comprising the step of introducing deformation patterns into the first and second shell portions in advance of said enclosing step.

33. A method according to claim 25, further comprising the steps of curing the rebar product as it is held in the first and second outer shell portions after said shaping step and stripping the first and second shell portions from the cured rebar product after said shaping step.

34. A method according to claim 33, wherein after said stripping step, the shell deformation patterns remain on the first and second shell portions and a corresponding pattern of deformations remain on the rebar product.

35. A method according to claim 25, wherein said shaping step comprises bending said rebar product while the rebar product is held in said first and second shell portions.

36. A method according to claim 35, wherein said shaping step comprises bending the enclosed first and second shell portions and rebar product held therein about a fixture such that the rebar product takes on a desired non-linear shape.

37. A method according to claim 25, further comprising the step of cutting the rebar product held in the enclosed first and second shell portions into a desired length prior to said shaping step.

38. A method according to claim 25, further comprising the steps of cutting the rebar product and first and second shell portions into a desired length and then shaping the rebar product while the rebar product is held in the first and second shell portions.

39. A method according to claim 38, further comprising the step of curing the rebar product held in the first and second shell portions after said cutting and shaping steps.

40. A method according to claim 39, further comprising the step of stripping the first and second shell portions from the rebar product after said curing step.

41. A method according to claim 40, wherein said enclosing step is carried out at a first site and said curing and said stripping steps are carried out at a second site remote from the first site.

42. A method according to claim 28, wherein the malleable material is formed from a continuous supply of planar metallic material.

43. A method according to claim 28, wherein said malleable material forming step comprises the steps of:

provingd a roll of elongate aluminum strip material;

forming two longitudinally extending channels into the elongate aluminum strip material;

dividing the two longitudinally extending channels of the elongate aluminum strip material into two adjacent strips; and introducing deformations into the two strips after said dividing step.

44. A method according to claim 43, wherein said channel forming step further comprises the steps of:

elevating a first one of the two strips after said introducing step thereby separating it from the other second strip such that the strips remain separated from one another during said core pultruding step and said cladding forming step.

45. A method according to claim 25, wherein said first and second outer shell portions together form an outer shell that defines an enclosed elongate cavity therebetween for holding said core and cladding layers therein, and wherein said forming step is carried out with said core pultruding and cladding forming steps.

46. A method according to claim 26, further comprising the steps of:

curing the rebar product after said attaching step to a final cure state;

stripping the first and second outer shell portions from the rebar product after said final cure state; and repeating said curing and stripping steps for a plurality of rebar products.

* * * * *

UNITED STATES PATENT AND TRADEMARK OFFICE
CERTIFICATE OF CORRECTION

PATENT NO.     : 6,485,660 B1
DATED          : November 26, 2002
INVENTOR(S)    : Kaiser et al.

It is certified that error appears in the above-identified patent and that said Letters Patent is hereby corrected as shown below:

Column 13,
Line 62, please add to the end of the penultimate sentence -- resin material include pigments and flame retardants. --

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,485,660 B1
DATED         : November 26, 2002
INVENTOR(S)   : Kaiser et al.

It is certified that error appears in the above-identified patent and that said Letters Patent is hereby corrected as shown below:

<u>Column 17,</u>
Line 40, please correct "claim 6" to read -- claim 16 --

Signed and Sealed this

Twenty-sixth Day of August, 2003

JAMES E. ROGAN
*Director of the United States Patent and Trademark Office*